US012756469B2

(12) United States Patent
Patronas et al.

(10) Patent No.: US 12,756,469 B2
(45) Date of Patent: Oct. 6, 2026

(54) OPTICAL COMMUNICATION CABLE WITH SELECTIVE COMMUNICATION STATES

(71) Applicant: MELLANOX TECHNOLOGIES, LTD., Yokneam (IL)

(72) Inventors: Ioannis (Giannis) Patronas, Piraeus (GR); Paraskevas Bakopoulos, Ilion (GR); Avraham Ganor, Shoham (IL); Nikolaos Argyris, Zografou (GR); Nimer Hazin, Bu'ayna Village (IL); Dimitrios Kalavrouziotis, Papagou (GR); Elad Mentovich, Tel Aviv (IL)

(73) Assignee: Mellanox Technologies, Ltd., Yokneam (IL)

( * ) Notice: Subject to any disclaimer, the term of this patent is extended or adjusted under 35 U.S.C. 154(b) by 156 days.

(21) Appl. No.: 18/440,228

(22) Filed: Feb. 13, 2024

(65) Prior Publication Data

US 2025/0202584 A1 Jun. 19, 2025

(30) Foreign Application Priority Data

Dec. 14, 2023 (GR) .............................. 20230101041

(51) Int. Cl.
*H04B 10/25* (2013.01)
*G02B 6/35* (2006.01)

(52) U.S. Cl.
CPC ....... *H04B 10/2589* (2020.05); *G02B 6/3598* (2013.01)

(58) Field of Classification Search
CPC .......................... H04B 10/2589; G02B 6/3598
USPC ............................................................ 398/41
See application file for complete search history.

(56) References Cited

U.S. PATENT DOCUMENTS

| | | | | |
|---|---|---|---|---|
| 9,048,952 | B2 * | 6/2015 | Niiho | G02B 6/28 |
| 11,817,904 | B2 | 11/2023 | Nielsen et al. | |
| 11,921,662 | B2 | 3/2024 | Levi et al. | |
| 12,028,662 | B2 * | 7/2024 | McDonald | H04Q 11/0005 |
| 2012/0315032 | A1 * | 12/2012 | Nguyen | G02B 6/4284 398/15 |

(Continued)

FOREIGN PATENT DOCUMENTS

| | | | | |
|---|---|---|---|---|
| KR | 102078484 B1 * | 2/2020 | | G02B 6/3807 |
| WO | WO-2015006568 A1 * | 1/2015 | | H04L 41/12 |

OTHER PUBLICATIONS

Patronas et al., Pending U.S. Appl. No. 18/083,981, filed Dec. 19, 2022.

*Primary Examiner* — Amritbir K Sandhu
(74) *Attorney, Agent, or Firm* — Alston & Bird LLP

(57) ABSTRACT

Apparatuses, systems, and methods are provided for optical communication with selective communication states. An example optical communication cable formed of one or more optical fibers includes a first end and a second end opposite the first end. The second end includes a first connector optically coupled with a first module, and a second connector optically coupled with a second module. The optical communication cable further includes a signal direction component optically coupled with the first end and the second end. The signal direction component is configured to switch between a first connection state in which optical connectivity is established between the first end and first connector and a second connection state in which optical connectivity is established between the first end and the second connector.

16 Claims, 8 Drawing Sheets

(56) References Cited

U.S. PATENT DOCUMENTS

| | | | | |
|---|---|---|---|---|
| 2014/0205285 | A1* | 7/2014 | Jiang | G02B 6/4246 398/45 |
| 2023/0006981 | A1* | 1/2023 | Syrivelis | G06F 9/45558 |
| 2024/0039627 | A1* | 2/2024 | Bakopoulos | H04B 10/073 |
| 2024/0053542 | A1* | 2/2024 | Kalavrouziotis | G02B 6/2773 |
| 2024/0098039 | A1 | 3/2024 | Patronas et al. | |
| 2024/0098040 | A1 | 3/2024 | Patronas et al. | |
| 2025/0112699 | A1* | 4/2025 | Cao | H04B 10/25891 |

* cited by examiner

OPTICAL COMMUNICATION CABLE WITH SELECTIVE COMMUNICATION STATES

CROSS-REFERENCE TO RELATED APPLICATIONS

This application claims priority to Greek patent application No. 20230101041, filed Dec. 14, 2023, the content of which application is hereby incorporated by reference herein in its entirety.

TECHNOLOGICAL FIELD

Example embodiments of the present disclosure relate generally to network communication systems and, more particularly, to selective optical communication devices and associated methods used in these communication systems.

BACKGROUND

Communication networks, systems, channels, and the like are employed in a variety of applications in order to transmit data from one location to another. These networks may leverage a large number of interconnected network ports, nodes, servers, racks, switches, cables, and/or the like to establish this communication. Applicant has identified a number of deficiencies and problems associated with networking systems and associated communications. Through applied effort, ingenuity, and innovation, many of these identified problems have been solved by developing solutions that are included in embodiments of the present disclosure, many examples of which are described in detail herein.

BRIEF SUMMARY

Systems, apparatuses, and methods are disclosed herein for optical communication with selective communication states. An example optical communication cable formed of one or more optical fibers may include a first end and a second end opposite the first end. The second end may include a first connector configured to be optically coupled with a first module and a second connector configured to be optically coupled with a second module. The optical communication cable may further include a signal direction component optically coupled with the first end and the second end. The signal direction component may be configured to switch between a first connection state in which optical connectivity is established between the first end and first connector and a second connection state in which optical connectivity is established between the first end and the second connector.

In some embodiments, the signal direction component may include one or more optical selectors or optical switches.

In some embodiments, the signal direction component may further include an electrical connector configured to be electrically connected with a network interface card (NIC) and/or server.

In some further embodiments, the signal direction component may be further configured to switch to the first connection state in the presence of an electrical supply voltage between the signal direction component and the NIC via the electrical connector.

In other further embodiments, the signal direction component may be configured to switch to the second connection state in the absence of an electrical supply voltage between the signal direction component and the NIC via the electrical connector.

In some still other embodiments, the signal direction component may be configured to switch between the first connection state and the second connection state in response to an instruction from the NIC and/or a change in optical power.

In some embodiments, in the first connection state, the signal direction component may be configured to direct optical signals from the first end to the first connector and the first module.

In some embodiments, in the first connection state, the signal direction component is configured to direct optical signals from the first module to the first end.

In some embodiments, in the second connection state, the signal direction component may be configured to direct optical signals from the first end to the second connector and the second optical module.

In some embodiments, in the second connection state, the signal direction component may be configured to direct optical signals from the second optical module to the first end.

In some embodiments, the first end further may further include a third connector configured to be optically coupled with a third module.

In some further embodiments, such as a 2×2 network implementation, the signal direction component may further include a first optical selector and a second optical selector.

In some still further embodiments, the first optical selector may be configured to be optically coupled with an optical transmitter of the third module, an optical receiver of the first module, and an optical receiver of the second module.

In some still further embodiments, the second optical selector may be configured to be optically coupled with an optical receiver of the third module, an optical transmitter of the first module, and an optical transmitter of the second module.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Overview

Figure 1:
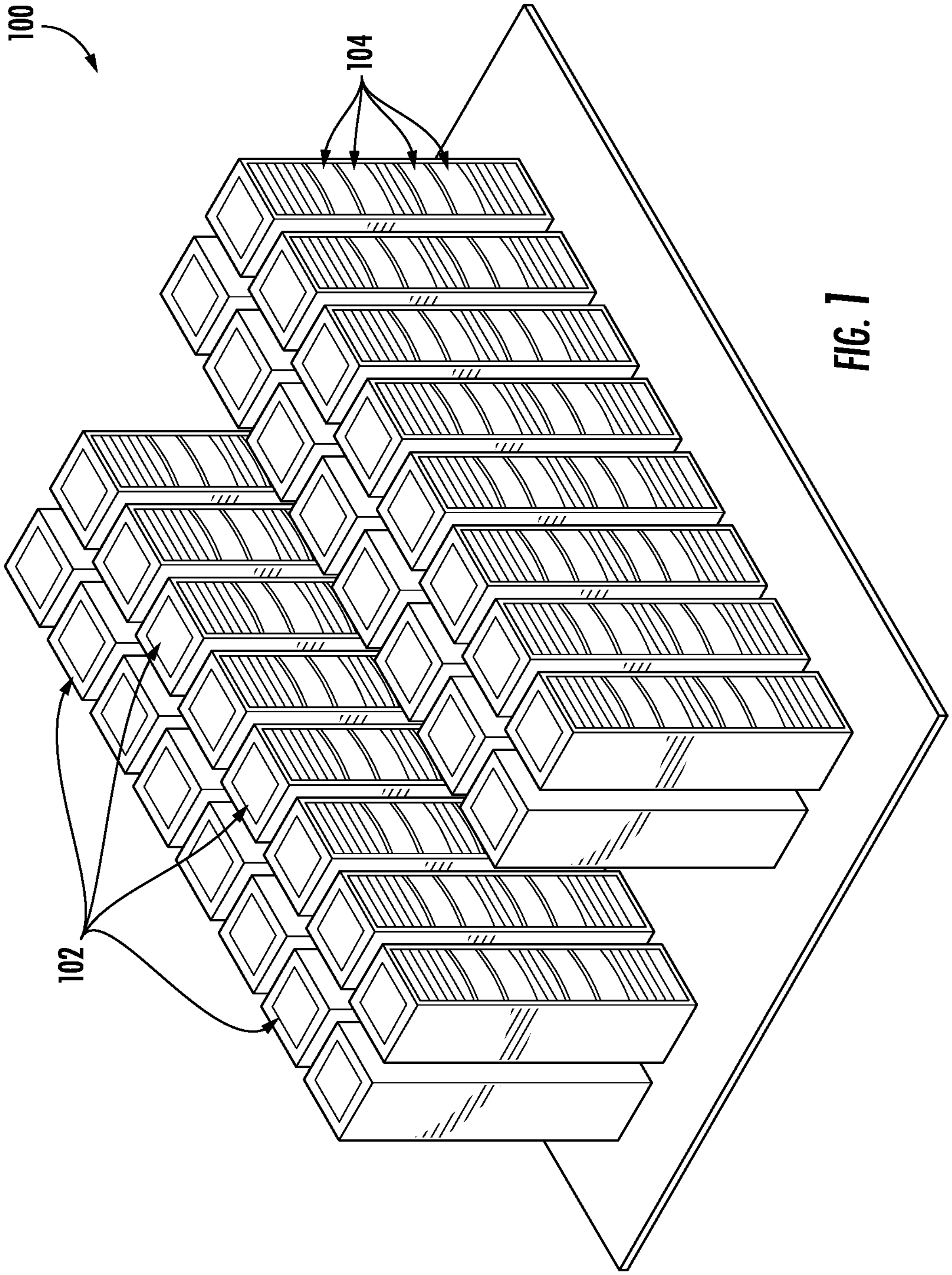
FIG. 1 illustrates an example network environment for implementing one or more embodiments of the present disclosure.

As described above, communication networks and systems are employed in a variety of applications in order to transmit data from one location to another. These networks, such as the example datacenter network 100 of FIG. 1, may leverage a large number of network nodes (e.g., ports, switches, host terminals, modules, and/or the like) that are interconnected to provide communication therebetween. By way of a nonlimiting example, the datacenter network 100 may include various racks 102 that include, support, or are otherwise formed of a various networking boxes 104. In some network communication implementations, various components, devices, switches, ports, nodes, modules, etc. may leverage optical communication-based techniques for data transmission in which optical signals (e.g., light that encodes underlying data entries) are transmitted. As such, the various networking boxes 104 may, for example, support optoelectronic components (e.g., optical transmitters, optical receivers, optical transceivers, etc.) that are configured to operate with optical signals. Although described hereinafter with reference to optical communication systems, the present disclosure contemplates that the selective communication techniques and mechanisms described herein may be applicable to communication systems or networks of any type. Furthermore, although described herein with reference to an example datacenter network 100, the present disclosure contemplates that communication networks of any type, configuration, etc. may leverage the devices and systems of the present disclosure.

Figure 2:
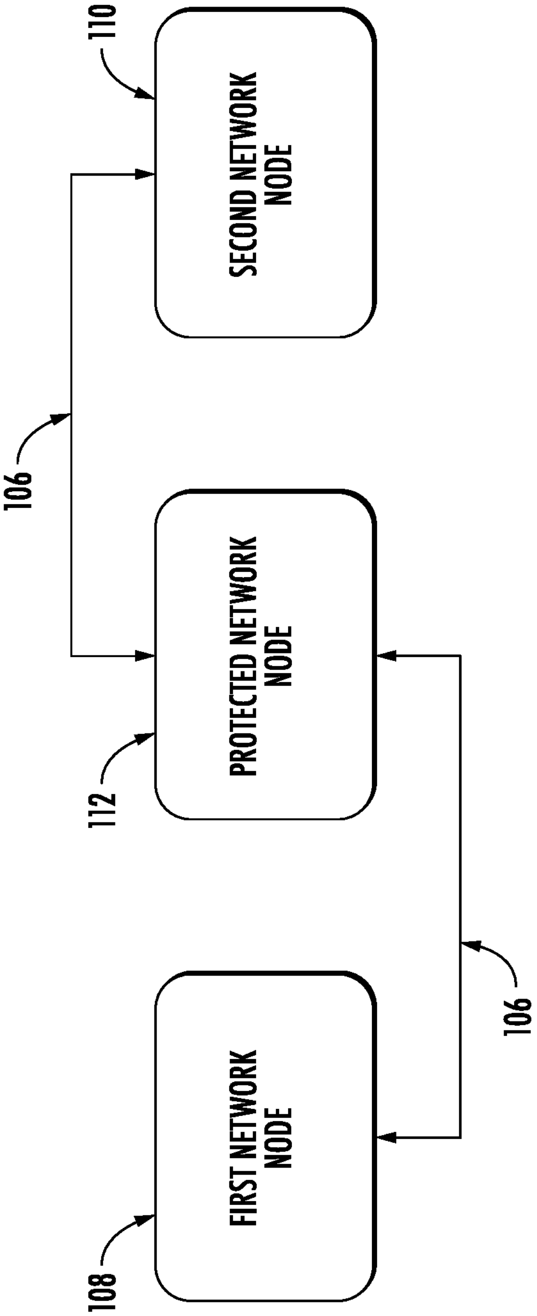
FIG. 2 illustrates an example network node connection scheme in accordance with one or more embodiments of the present disclosure.
Figure 3:
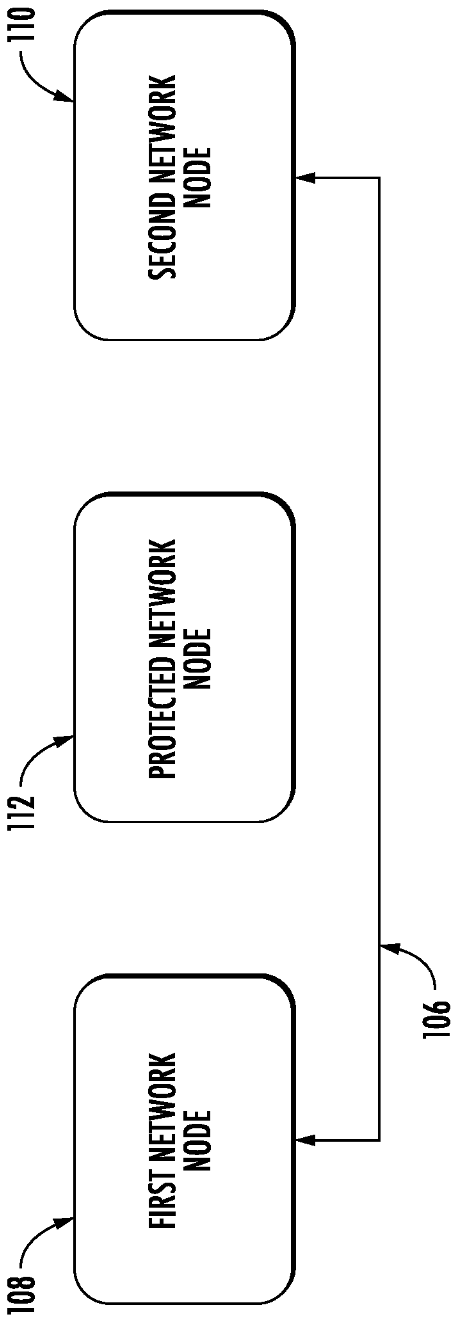
FIG. 3 illustrates another example network node connection scheme in accordance with one or more embodiments of the present disclosure.

With reference to FIGS. 2-3, example network node connection schemes are illustrated that may, for example, exist in the example datacenter network 100. As shown in FIG. 2, for example a first network node 108 may be optically coupled with a protected network node 112 via an optical cable 106 such that signals may be transmitted between the first network node 108 and the protected network node 112. The protected network node 112 may similarly be optically coupled with a second network node 108 via another optical cable such that signals may be transmitted between the second network node 110 and the protected network node 112. As shown in FIG. 3, however, direct optical connection between the first network node 108 and the second network node 110 may, in some instances, be required, such as in instances in which the protected network node 112 is unavailable (e.g., scheduled maintenance, operational failure, etc.). Although described with reference to FIGS. 2-3 as network nodes 108, 110, and 112, the present disclosure contemplates that the optical communication cables and methods described herein may be applicable to any modules, ports, switches, etc. that may be used in communication systems. Said differently, the present disclosure may interchangeably refer to network nodes, ports, and modules that are connected via the optical communication cables described hereinafter.

In order to address the change in connectivity or network communication (e.g., from FIG. 2 to FIG. 3), communication systems were traditionally required to be rewired, such as by manually disconnecting optical cables 106 and reconnecting these optical cables 106. Conventional attempts at avoiding rewiring operations have relied on server bypass adapters that are often bulky in size and/or require additional cabling. For example, conventional solutions often required large form factor adapters (e.g., rack mountable or blade adapters) that further require modification to rack 102. As such, these conventional solutions are often cost prohibitive (e.g., an increased number of cables and components) and require modifications to underlying network infrastructure.

In order to address these problems and others, the embodiments of the present disclosure are directed to an optical communication cable that provides signal redirection functionality, such as between networking nodes, ports, modules, etc. The optical communication cable embodiments described herein provide an integrated solution in that the cable defines a first end and a second end where the second end includes a pair of connectors (e.g., first and second connectors) for respective optical modules (e.g., network nodes) and further includes a signal direction component (e.g., optical selectors or the like) that may switch between a first connection state in which optical connectivity is established between the first end and a first connector and a second connection state in which optical connectivity is established between the first end and the second connector. In some instances, the cable may further include an electrical connector to a network interface controller (NIC) or server such that the connection state is determined in response to the presence or absence of power to the NIC and/or associated server. In doing so, the optical communication cables of the present disclosure may provide an integrated cabling solution that provides selective optical communication (e.g., signal redirection) while avoiding modification to the underlying network components (e.g., racks, ports, nodes, modules, etc.).

Embodiments of the present disclosure now will be described more fully hereinafter with reference to the accompanying drawings in which some but not all embodiments are shown. Indeed, the present disclosure may be embodied in many different forms and should not be construed as limited to the embodiments set forth herein; rather, these embodiments are provided so that this disclosure will satisfy applicable legal requirements. Like numbers refer to like elements throughout. Furthermore, as would be evident to one of ordinary skill in the art in light of the present disclosure, the terms “substantially” and “approximately” indicate that the referenced element or associated description is accurate to within applicable engineering tolerances.

As used herein, “operatively coupled” or “communicably coupled” may mean that the components are electronically coupled and/or are in electrical communication with one another, or optically coupled and/or are in optical communication with one another. Furthermore, "operatively coupled" may mean that the components may be formed integrally with each other or may be formed separately and coupled together. Furthermore, "operatively coupled" may mean that the components may be directly connected to each other or may be connected to each other with one or more components (e.g., connectors) located between the components that are operatively coupled together. Furthermore, "operatively coupled" may mean that the components are detachable from each other or that they are permanently coupled together. In light of the optical communication techniques described herein, the optical communication cable of the present disclosure may be described as "optically coupled" with one or more modules, nodes, ports, etc.

As described herein, network ports, nodes, modules, etc. may be referred to with reference to the transmission and/or receipt of optical signals, such as via optical transmitters and optical receivers, respectively, associated with these network ports, nodes, modules, etc. As such, the present disclosure, therefore, contemplates that the network ports, nodes, modules, etc. described herein may operate to transmit data, signals, and information to and receive data, signals, and information from any device communicably coupled thereto. Said differently, the description of optical communication established between one or more devices described herein by the optical communication cables of the present disclosure contemplates that optical signals may be transmitted and/or received by any number of communication channels based on the characteristics of the associated communication network. Furthermore, the present disclosure contemplates that the physical implementations of the embodiments described herein (e.g., the optical communication cable) may be configured to support a plurality of signal direction components (e.g., optical selectors, optical switches, etc. described hereafter) so as to provide an integrated communication solution that may serve optical transceivers having a plurality of communication lanes.

Example Optical Communication Cable

Figure 4:
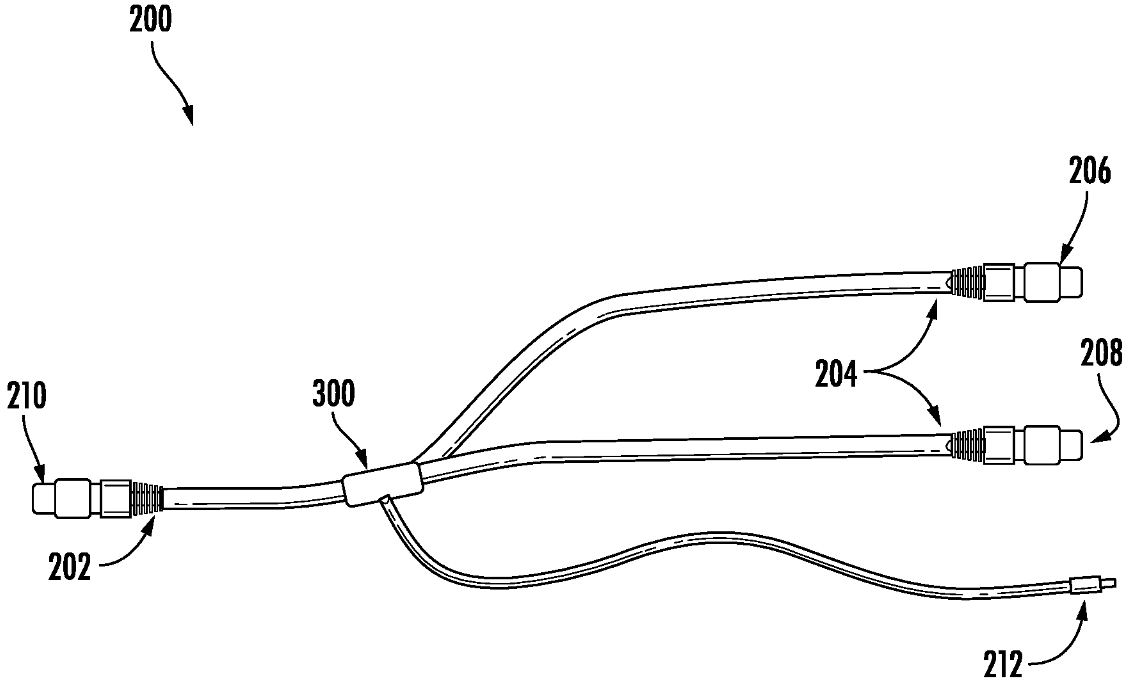
FIG. 4 illustrates an example optical communication cable in accordance with one or more embodiments of the present disclosure.

With reference to FIG. 4, an example optical communication cable 200 with selective communication states (e.g., cable 200) is illustrated. As would be evident to one of ordinary skill in the art in light of the present disclosure, the cable 200 may be formed of one or more optical fibers so as to provide optical communication. Although described herein with reference to one or more optical fibers, the present disclosure contemplates that the cable 200 may include any optical communication medium formed of any material (e.g., glass, plastic, etc.) through which light may propagate. Furthermore, the present disclosure contemplates that the number of optical fibers and their associated dimensions (e.g., size and shape) may vary based on the characteristics (e.g., communication lanes or the like) associated with the network implementing the cable 200.

With continued reference to FIG. 4, the optical communication cable 200 may include a first end 202 and a second end 204 opposite the first end 202. The second end 204 may include a first connector 206 configured to be optically coupled with a first module (e.g., network node, port, etc.). The second end 204 may further include a second connector 208 configured to be optically coupled with a second module (e.g., network node, port, etc.). The first connector 206 and the second connector 208 may be dimensioned (e.g., sized and shaped) so as to be physically received by the respective module associated with the connector. The first end 202 may similarly include a third connector 210 configured to be optically coupled with a third module (e.g., network node, port, etc.). Such a third connector 210 may be dimensioned (e.g., sized and shaped) so as to be physically received by the third module associated with the connector. The present disclosure contemplates that the first connector 206, the second connector 208, and the third connector 210 may be of any type (e.g., Multi-fiber Push On (MPO), Lucent Connector (LC), Very Small Form Factor (VSFF) connectors, and/or the like) based on the configuration of the associated module. In some embodiments, the first connector 206, the second connector 208, and the third connector 210 may be of the same type. In other embodiments, one or more of the first connector 206, the second connector 208, and/or the third connector 210 may be of different types.

In order to provide selective optical communication (e.g., optical signal direction and redirection), the optical communication cable 200 may further include a signal direction component 300. As shown in FIG. 4, the signal direction component 300 may be optically coupled with the first end 202 and the second end 204. As described above, the cable 200 of the present disclosure provides an integrated solution in which the selective optical communication functionality is provided by the cable 200. In other words, the optical communication cable 200, as shown in FIG. 4, may define the signal direction component 300 in that the signal direction component 300 is formed integrally in the optical path extending between the first end 202 and the second end 204 of the cable 200. In this way, the cable 200 may provide an integrated solution not found in traditional server adapters as described above. As described hereinafter with reference to FIGS. 5A-7, the signal direction component 300 may be configured to switch between connection or communication states so as to direct optical signals to particular modules, ports, nodes, etc. within the communication network.

In some embodiments, the signal direction component 300 may include an electrical connector 212 configured to be electrically connected with a network interface card (NIC) or associated server (e.g., another computing device of the communication network). As described hereafter, the signal direction component 300 may, in some embodiments, operate to change connection states in instances in which electrical power is absent with a particular module, port, or node. By way of example, a protected node or module of the communication network may be powered down (e.g., for scheduled maintenance, component upgrades, etc.) or otherwise lose electrical power (e.g., a malfunction or failure event), and the absence of an electrical supply voltage may cause the signal direction component 300 to change connection states. In other embodiments, the signal direction component 300 may operate to switch between connection states in response to instructions from the NIC and/or server connected to the cable 200. As such, the electrical connector 212 may be configured to communicably couple the signal direction component 300 with the NIC or server (not shown) in this embodiment.

Figure 5A:
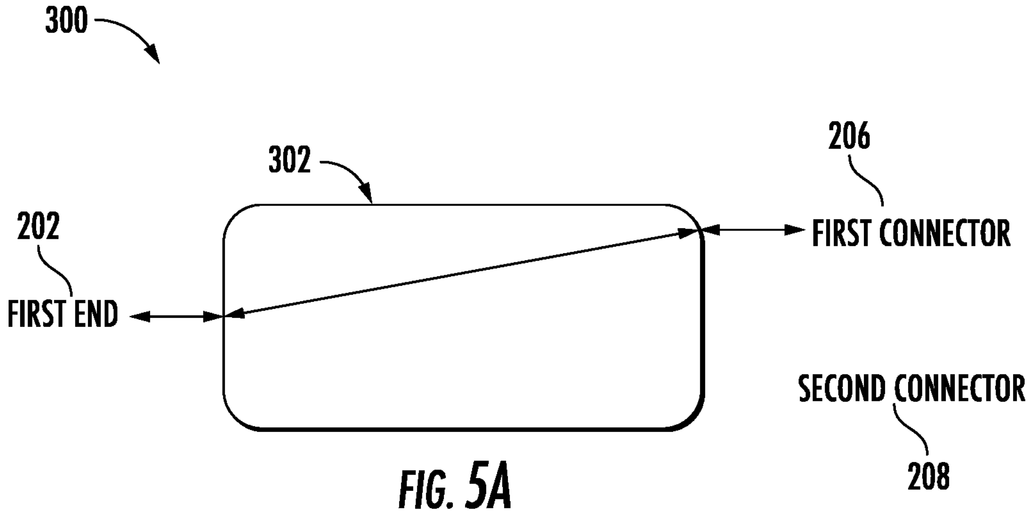
FIGS. 5A-5B illustrate connection states of an example signal direction component in accordance with one or more embodiments of the present disclosure.
Figure 5B:
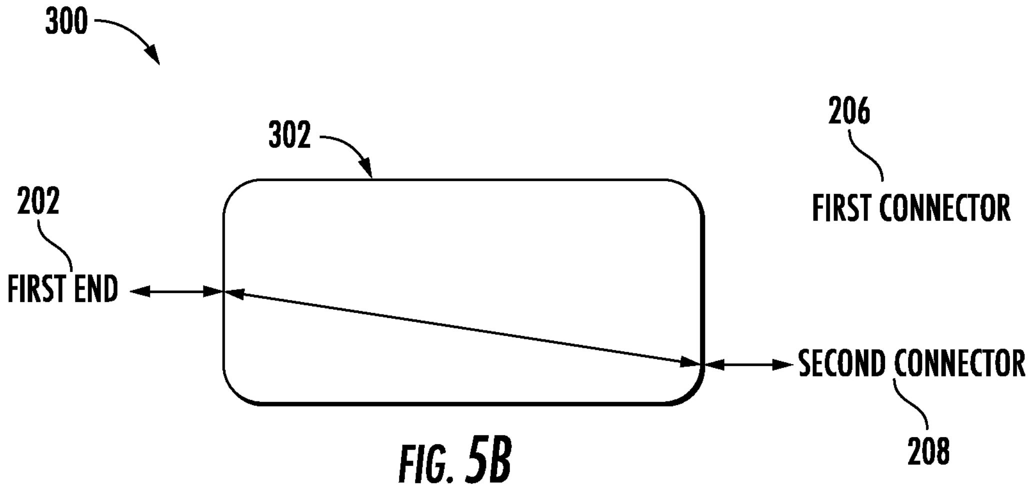

With reference to FIGS. 5A-5B, the signal direction component 300 is illustrated as an optical selector and/or optical switch in a 1×2 network communication scheme. As shown, the signal direction component 300 may include one or more optical switches or selectors 302 that are configured to switch between a first connection state as shown in FIG. 5A and a second connection state in FIG. 5B. As would be evident to one of ordinary skill in the art, an optical selector or optical switch 302 may refer to a component configured to modify the direction of optical signals (e.g., light). By way of example, an optical selector or optical switch 302 may include various mirrors, micro electro-mechanical system (MEMS) controllers, collimators, etc. that are collectively configured to receive an optical signal (e.g., light) and direct the optical signal to a particular location (e.g., an optical fiber connected thereto). By way of an additional example, the optical selector or optical switch 302 may, for example, be a solid-state based implementation. Such a solid-state implementation may, for example, include a photonic integrated circuit (PIC) within which optical signals (e.g., light) propagates in waveguides, and the PIC may be optically coupled with the optical fibers of the cable 200. The example PIC may change between the first connection state and the second connection state by various principles or techniques, such as by changing the direction of the light's propagation by MEMS actuation and/or electro-refraction.

As shown in FIG. 5A, the optical switch or optical selector 302 may be configured to switch to a first connection state in which optical connectivity is established between the first end 202 and first connector 206. In this first connection state, the signal direction component 300 (e.g., via the optical selector or optical switch 302) may be configured to direct optical signals from the first end 202 to the first connector 206 and the first module (not shown). As described above with reference to the bidirectionality of the optical communications described herein, in the first connection state, the signal direction component 300 may also be configured to direct optical signals from the first module (e.g., optically coupled with the first connector 206) to the first end 202. In an embodiment in which the first end 202 includes a third connector 210 optically coupled with a third module, the first connection state of FIG. 5A may refer to the ability to transmit optical signals between the third module and the first module.

As shown in FIG. 5B, the optical switch or optical selector 302 may be configured to switch to a second connection state in which optical connectivity is established between the first end 202 and the second connector 208. In this second connection state, the signal direction component 300 (e.g., via the optical selector or optical switch 302) may be configured to direct optical signals from the first end 202 to the second connector 208 and the second optical module (not shown). As described above with reference to the bidirectionality of the optical communications described herein, in the second connection state, the signal direction component 300 may also be configured to direct optical signals from the second optical module (e.g., optically coupled with the second connector 208) to the first end 202. In an embodiment in which the first end 202 includes a third connector 210 optically coupled with a third module, the first connection state of FIG. 5B may refer to the ability to transmit optical signals between the third module and the second module.

As described above, in some embodiments, the signal direction component 300 may further include an electrical connector (e.g., electrical connection 212 in FIG. 4) configured to be electrically connected with a network interface card (NIC) or server. In such an embodiment, the signal direction component 300 (e.g., via the optical selector or optical switch 302) may be configured to switch to the first connection state of FIG. 5A in the presence of an electrical supply voltage between the signal direction component 300 and the NIC or server via the electrical connector 212. In such an embodiment, the signal direction component may be further configured to switch to the second connection state of FIG. 5B in the absence of the electrical supply voltage between the signal direction component 300 and the NIC or server via the electrical connector 212. In doing so, the electrical connector 212 may operate to provide a passive mechanism (e.g., in the absence of explicit instructions from a computing device) for switching between the first connection state (e.g., FIG. 5A) and the second connection state (e.g., FIG. 5B). Although described herein with reference to an electrical supply voltage (e.g., the existence of electrical power), the present disclosure contemplates that any network characteristic, attribute, parameter, etc. may be used to cause the signal direction component 300 to switch between the first connection state and the second connection state. By way of a non-limiting example, the signal direction component 300 may operate to switch between the first connection state and the second connection state in response to an optical power determination associated with one or more of the network nodes, ports, modules, etc. of the associated network.

By way of a non-limiting example, the optical communication cable 200 described herein may be used to optically connect a first network node (e.g., third module), a protected network node (e.g., a first module), and a second network node (e.g., a second module), such as illustrated in FIGS. 2-3. The cable 200, for example, may be connected by the third connector 210 of the first end 202 with the first network node, may be connected by the first connectors 206 of the second end 204 with a protected network node, and may be connected by the second connector 208 of the second end 204 with a second network node. At the first connection state (e.g., the presence of an electrical supply voltage to the NIC that is coupled with the protected network node), the signal direction component 300 may operate to direct optical signals (e.g., transmitted or received) between the first network node (e.g., third module) and the protected network node (e.g., first module). At the second connection state (e.g., the absence of an electrical supply voltage to the NIC that is coupled with the protected network node), the signal direction component 300 may operate to direct optical signals (e.g., transmitted or received) between the first network node (e.g., third module) and the second network node (e.g., second module). As described above, in some embodiments, the signal direction component 300 may actively receive instructions from one or more computing devices communicably coupled thereto (e.g., the NIC, a server, the protected network node, etc.) and switch between the first and the second connection states in response to these instructions. Although described with reference to a 1×2 network implementation above, the present disclosure contemplates that the signal direction component 300 may include any number of optical selectors or switches 302 based on the intended network implementation.

Figure 6:
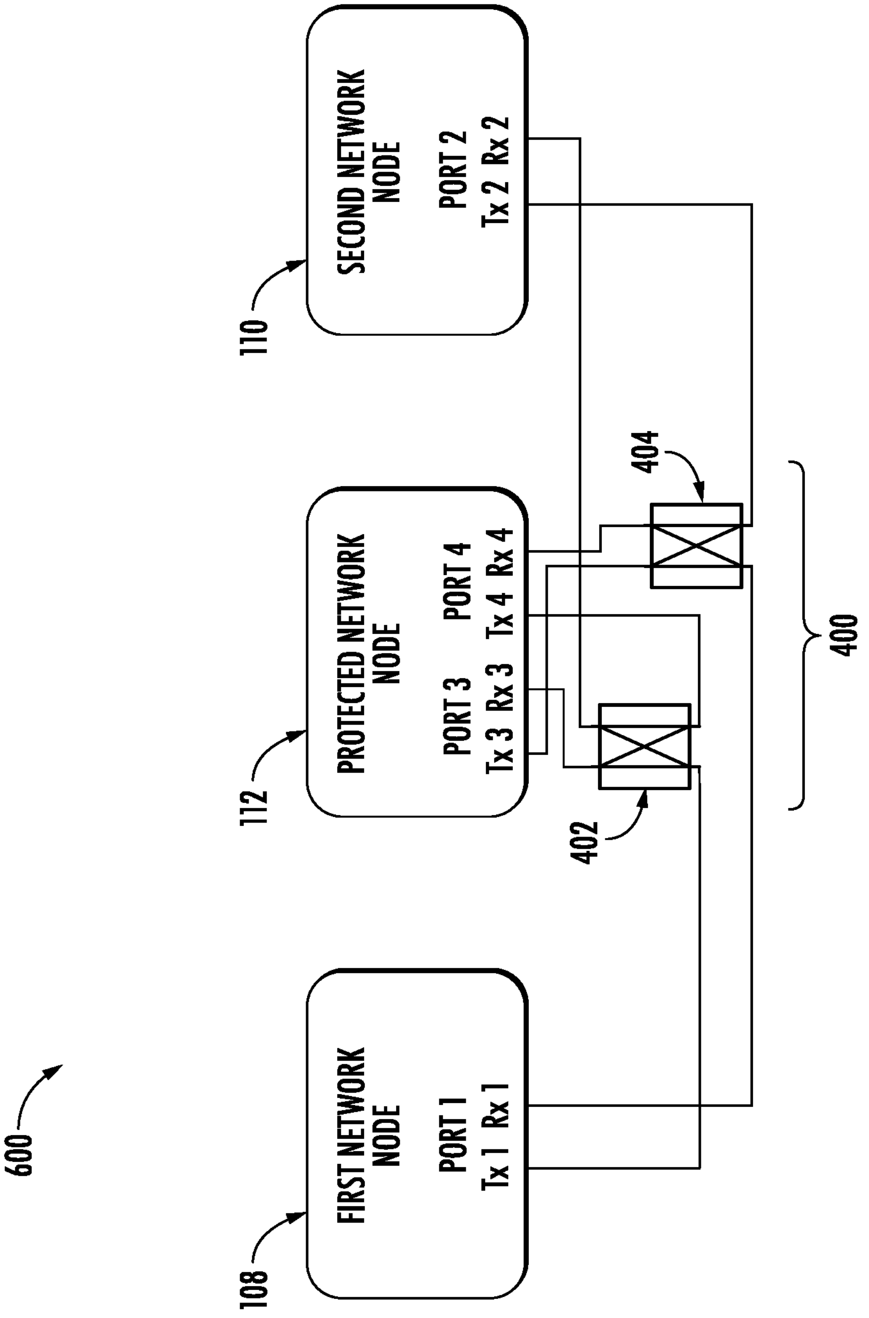
FIG. 6 illustrates an example 2×2 network node connection scheme implementing an example optical communication cable in accordance with the present disclosure.
Figure 7A:
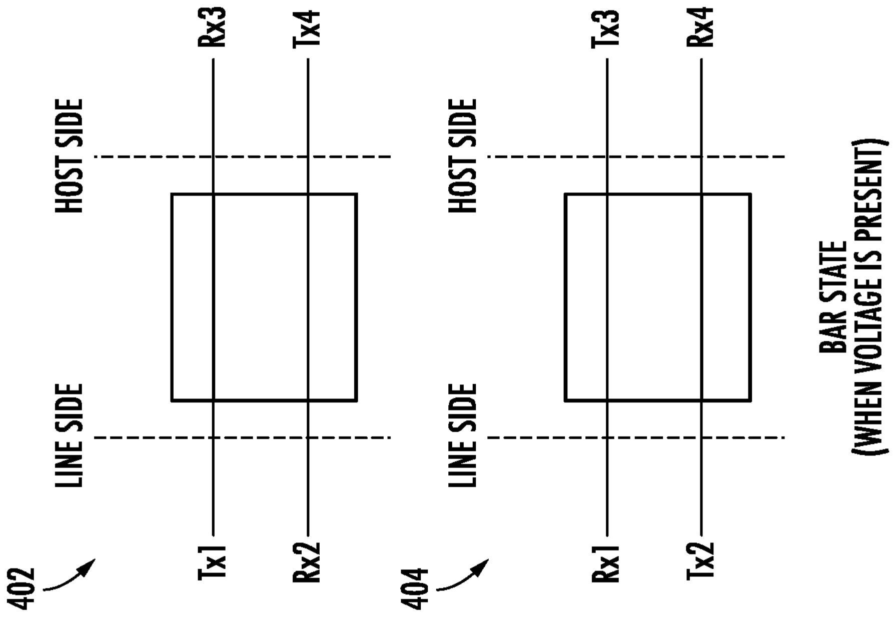
FIG. 7A illustrates a first and second optical selector of an example signal direction component of the 2×2 network node connection scheme of FIG. 6 in the presence of an electrical voltage supply in accordance with one or more embodiments of the present disclosure.
Figure 7B:
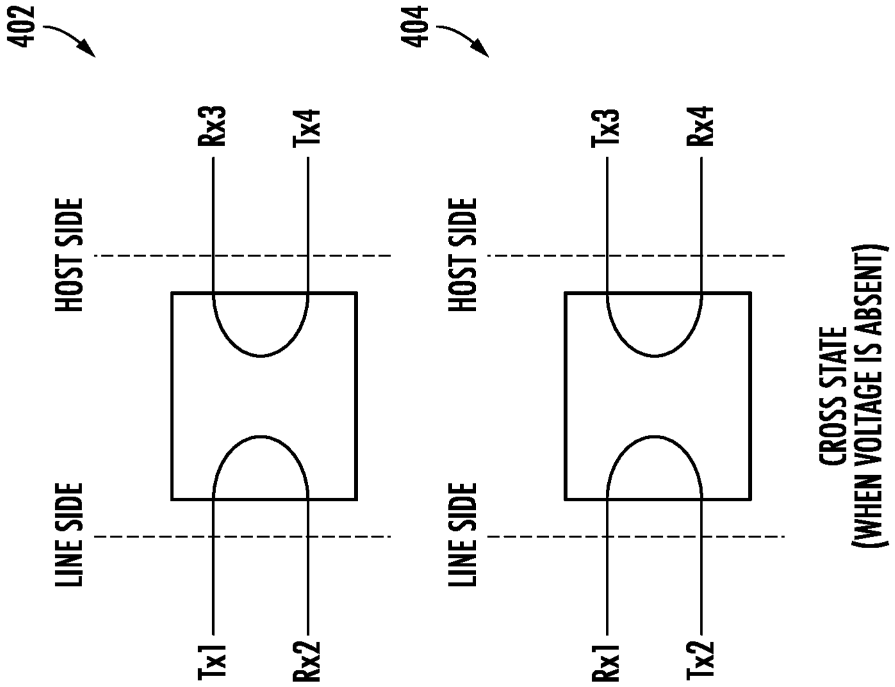
FIG. 7B illustrates the first and second optical selector of the example signal direction component of the 2×2 network node connection scheme of FIGS. 6-7A in the absence of an electrical voltage supply in accordance with one or more embodiments of the present disclosure.

By way of example, with reference to FIGS. 6-7B, an example 2×2 network node connection scheme 600 (e.g., network 600) is illustrated with which the optical communication cables 200 of the present disclosure may operate. As shown, the network 600 may include a first network node 108 having a first optical transmitter Tx1 and a first optical receiver Rx1. The network 600 may further include a second network node 110 having a second optical transmitter Tx 2 and a second optical receiver Rx 2. The network 600 may further include a protected network node 112 having a third optical transmitter Tx 3, a third optical receiver Rx 3, a fourth optical transmitter Tx 4, and a fourth optical receiver Rx 4. The optical communication cables 200 described above may be used to optically couple the first network node 108, the second network node 110, and the protected network node 112. In order to provide this optical connectivity, the optical communication cable 200 may include a signal direction component 400 that includes a pair of optical selectors or optical switches 402, 404.

By way of continued example, the signal direction component 400 may include a first optical selector or optical switch 402 and a second optical selector or optical switch 404. The first optical selector 402 may be configured to be optically coupled with the first optical transmitter Tx 1 (e.g., an optical transmitter of the third module), the third optical receiver Rx 3 (e.g., an optical receiver of the first module), the second optical receiver RX 2 (e.g., an optical receiver of the second module), and the fourth optical transmitter Tx 4 (e.g., another optical transmitter of the first module). The second optical selector or optical switch 404 may be configured to be optically coupled with the first optical receiver RX 1 (e.g., an optical receiver of the third module), the third optical transmitter TX 3 (e.g., an optical transmitter of the first module), the second optical transmitter TX 2 (e.g., an optical transmitter of the second module), and a fourth optical receiver RX 4 (another optical receiver of the first module). The present disclosure contemplates that the first and second optical selectors or switches 402, 404 may be optically connected with any of the respective optical transmitters or receivers based on the intended application of the network 600.

With reference to FIGS. 7A-7B, operation of the first and second optical selectors or switches 402, 404 is shown. In FIG. 7A, a first connection state is illustrated in which the first optical selector or optical switch 402 is configured to direct optical signals that are generated by the first optical transmitter Tx 1 of first network node 108 to the third optical receiver Rx 3 of the protected network node 112 and direct optical signals generated by a fourth optical transmitter Tx 4 of the protected network node 112 to the second optical receiver Rx 2 of the second network node 110. In the first connection state, the second optical selector or optical switch 404 is configured to direct optical signals that are generated by the third optical transmitter Tx 3 of protected network node 112 to the first optical receiver Rx 1 of the first network node 108 and direct optical signals generated by the second optical transmitter Tx 2 of the second network node 110 to a fourth optical receiver Rx 4 of the protected network node 112. As above, the first connection state may, in some embodiment, refer to an instance in which an electrical supply voltage is present (e.g., a bar state).

In FIG. 7B, a second connection state is illustrated. In the second connection state, the first optical selector or optical switch 402 is configured to direct optical signals that are generated by the first optical transmitter Tx 1 of first network node 108 to the second optical receiver Rx 2 of the second network node 110. In the second connection state, the second optical selector or optical switch 404 is configured to direct optical signals that are generated by the second optical transmitter Tx 2 of the second network node 110 to the first optical receiver Rx 1 of the first network node 108. In other words, the second connection state for the example embodiment of FIGS. 6-7B may refer to an instance in which the optical communication cable 200 operates to directly connect the first network node 108 and the second network node 110 by bypassing the protected network node 112. As above, the second connection state may, in some embodiment, refer to an instance in which an electrical supply voltage is absent (e.g., a cross state).

Example Methods for Selective Optical Communication

Figure 8:
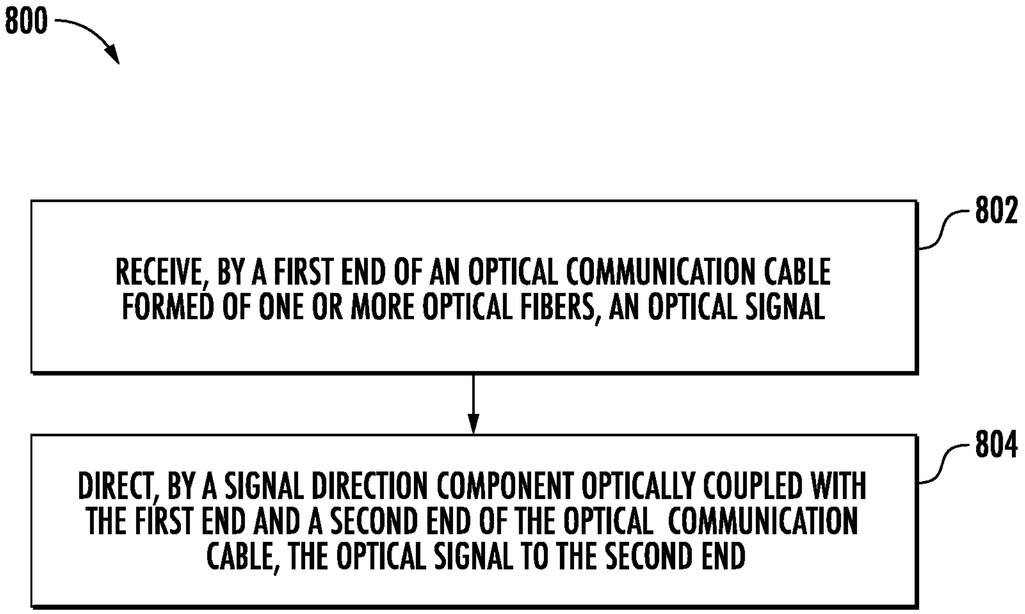
FIG. 8 illustrates an example method for selective optical communication in accordance with one or more embodiments of the present disclosure.

With reference to FIG. 8, an example method (e.g., method 800) for selective optical communication is illustrated. As shown in Block 802, the method may include receiving, by a first end of an optical communication cable formed of one or more optical fibers, an optical signal. As described above, the optical communication cable may be formed of one or more optical fibers so as to provide optical communication and may include any optical communication medium formed of any material (e.g., glass, plastic, etc.) through which light may propagate. The first end of the optical communication cable may, as described above, include a third connector configured to optically couple the first end with an associated network node, port, module, etc. As such, the optical signals received at Block 802 may refer to one or more optical signals that are generated by opto-electronic components of the network node, port, module, etc. optically coupled with the first end via the third connector. The present disclosure contemplates that the number of optical signals, communication lanes, and/or other characteristics may vary based on the operating characteristics of the associated network node, port, or module.

Thereafter, as shown in Block 804, the method 800 may include directing, by a signal direction component optically coupled with the first end and a second end of the optical communication cable, the optical signal to the second end. As described above, the second end may include a first connector configured to be optically coupled with a first end, and a second connector 208 configured to be optically coupled with a second module. In order to provide selective optical communication (e.g., optical signal direction and redirection), the optical communication cable may further include a signal direction component. As described above with reference to FIGS. 5A-7B, the signal direction component may be configured to switch between connection or communication states so as to direct optical signals to particular modules, ports, nodes, etc. within the communication network. By way of continued example, the signal direction component may be configured to, via optical selectors or optical switches, switch between a first connection state in which optical connectivity is established between the first end and a first connector defined by the second end that is configured to be optically coupled with a first module and a second connection state in which optical connectivity is established between the first end and a second connector that is configured to be optically coupled with a second module. As described above, the selective optical communication methods described herein may be applicable to network node configurations or connection schemes (e.g., 1×2, 2×2, etc.) of any type.

Many modifications and other embodiments of the present disclosure will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An optical communication cable formed of one or more optical fibers, the optical communication cable comprising:
a first end;
a second end opposite the first end, wherein the second end comprises:
a first connector configured to be optically coupled with a first module;
a second connector configured to be optically coupled with a second module; and
a signal direction component optically coupled with the first end and the second end, wherein the signal direction component comprises an electrical connector configured to be electrically connected with a network interface card (NIC) or a server, and wherein the signal direction component is configured to switch between:
a first connection state in which optical connectivity is established between the first end and the first connector; and
a second connection state in which optical connectivity is established between the first end and the second connector,
wherein the signal direction component is configured to switch to the second connection state in an absence of an electrical supply voltage between the signal direction component and the NIC via the electrical connector.

2. The optical communication cable according to claim 1, wherein the signal direction component comprises one or more optical selectors.

3. The optical communication cable according to claim 1, wherein the signal direction component is configured to switch to the first connection state in a presence of an electrical supply voltage between the signal direction component and the NIC via the electrical connector.

4. The optical communication cable according to claim 1, wherein the signal direction component is further configured to switch between the first connection state and the second connection state in response to an instruction from the NIC or the server.

5. The optical communication cable according to claim 1, wherein, in the first connection state, the signal direction component is configured to direct optical signals from the first end to the first connector and the first module.

6. The optical communication cable according to claim 1, wherein, in the first connection state, the signal direction component is configured to direct optical signals from the first module to the first end.

7. The optical communication cable according to claim 1, wherein, in the second connection state, the signal direction component is configured to direct optical signals from the first end to the second connector and the second module.

8. The optical communication cable according to claim 1, wherein, in the second connection state, the signal direction component is configured to direct optical signals from the second module to the first end.

9. The optical communication cable according to claim 1, wherein the first end further comprises a third connector configured to be optically coupled with a third module.

10. The optical communication cable according to claim 9, wherein the signal direction component further comprises:
a first optical selector; and
a second optical selector.

11. The optical communication cable according to claim 10, wherein:
the first optical selector is configured to be optically coupled with an optical transmitter of the third module, an optical receiver of the first module, and an optical receiver of the second module.

12. The optical communication cable according to claim 10, wherein:
the second optical selector is configured to be optically coupled with an optical receiver of the third module, an optical transmitter of the first module, and an optical transmitter of the second module.

13. A method for selective optical communication, the method comprising:
receiving, by a first end of an optical communication cable formed of one or more optical fibers, an optical signal; and
directing, by a signal direction component optically coupled with the first end and a second end of the optical communication cable, the optical signal to the second end,
wherein the signal direction component comprises an electrical connector configured to be electrically connected with a network interface card (NIC) or a server, and wherein the signal direction component is configured to switch between:
a first connection state in which optical connectivity is established between the first end and a first connector defined by the second end that is configured to be optically coupled with a first module; and
a second connection state in which optical connectivity is established between the first end and a second connector that is configured to be optically coupled with a second module,
wherein the signal direction component is configured to switch to the second connection state in an absence of an electrical supply voltage between the signal direction component and the NIC via the electrical connector.

14. The method according to claim 13, wherein the signal direction component comprises one or more optical selectors.

15. The method according to claim 13, wherein the signal direction component is configured to switch to the first connection state in a presence of an electrical supply voltage between the signal direction component and the NIC via the electrical connector.

16. The method according to claim 13, wherein the signal direction component is configured to switch between the first connection state and the second connection state in response to an instruction from the NIC or the server.

* * * * *